W. R. SPRINGER.

SPRING STEEL BAND.

APPLICATION FILED JUNE 2, 1919.

Reissued Nov. 25, 1919. 14,762.

Witnesses:
R. Burkhardt.
Milton A. Miller

Inventor:
W. R. Springer,
By Wilkinson & Ashley
Attys.

UNITED STATES PATENT OFFICE.

WILSON ROY SPRINGER, OF OSKALOOSA, IOWA.

SPRING-STEEL BAND.

14,762. Specification of Reissued Letters Patent. Reissued Nov. 25, 1919.

Original No. 1,278,779, dated September 10, 1918, Serial No. 231,867, filed May 1, 1918. Application for reissue filed June 2, 1919. Serial No. 301,330.

*To all whom it may concern:*

Be it known that I, WILSON ROY SPRINGER, a citizen of the United States, and a resident of Oskaloosa, in the county of Mahaska and State of Iowa, have invented certain new and useful Improvements in Spring-Steel Bands, of which the following is a specification.

My invention is an improvement in spring steel bands, and has for its object to provide a band of the character specified adapted for tying up mail matter, as for instance packages of letters and the like, wherein the band may be used many times, the band having interengaging means at its ends for permitting it to be attached about the package, the attaching means being adjustable for various size packages.

Figure 1:
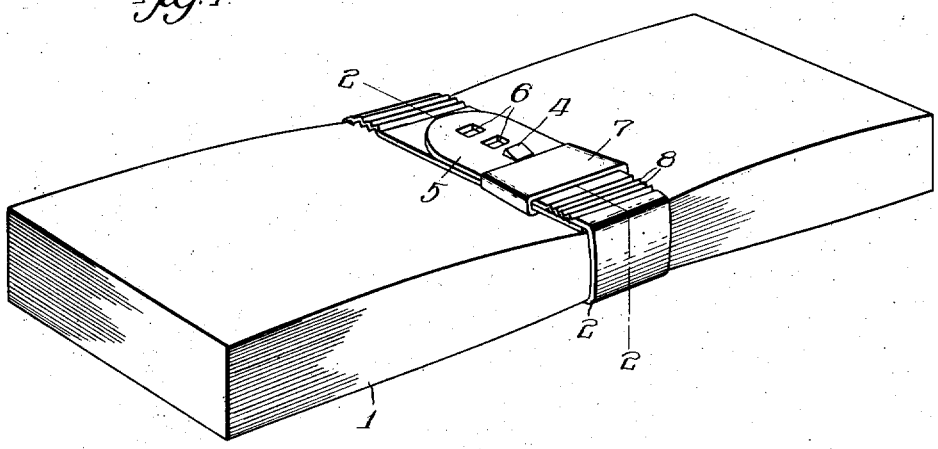
Figure 1 is a perspective view of the improved band in use.

The present embodiment of the invention is shown in connection with a package of letters or the like, the band being arranged about the center of the package in the same manner as the string commonly used.

The improved band 2 is of spring steel or other resilient metal, of suitable length and width. One end portion 3 of the band is provided with an anchoring lug 4, while the other end 5 is provided with a series of recesses 6, any one of which is adapted to receive said lug when the ends 3 and 5 are overlapped. Upon the end portion 3 is a hoop or keeper 7 fastened to the strap and adapted to hold the perforated end portion down upon the lug-bearing end portion, and thereby adapt the fastening to withstand tension on the strap.

An important feature of my invention resides in the relative locations of the lug 4 and keeper 7 upon the end portion 3. By locating the keeper over the surface that the lug rises from, it effectively holds the recessed end against springing up. Yet, by locating it a distance in advance of the lug, it leaves free a length of protruding end 5 that affords the resiliency required in flexing the end up above the lug in locking and unlocking the strap. The keeper is preferably also located to leave a surface of strap continuing on the opposite side of the keeper from the lug, to afford a surface to guide the intruded end to the loop, and to still more surely sustain the end portion 5 in parallelism with the end portion 3 by supporting it on the remote side of the loop, and therefore avoid tendency of the recess to unlock from the lug.

This lug 4 which is a catch has that face remote from the loop 7 perpendicular to the face of the band, while the other face is inclined to allow the opposite end 5 of the band, when passed through the loop 7, to be easily engaged with the lug 4 at any one of the openings 6. The opposite end 5 of the band has a series 6 of openings, the said openings being rectangular in the present instance, and having one axis transverse to the band. These openings are spaced apart at suitable intervals, and they are adapted to engage the lug 4 and to receive the said lug 4 so that the end 5 of the band will lie smoothly upon the end 3 of the band when the lug 4 and one of the openings 6 are engaged.

The loop 7 has that side adjacent to the end of the band 2 of greater width, thus allowing more space when the end 5 is to be passed through the loop 7 and eliminating any possibility of the end 5 becoming caught in being passed through the loop 7.

In placing the band, it is placed around the package in the usual manner and the end 5 of the band is passed through the loop 7 and engaged with the lug 4 at one of the openings 6.

Figure 2:
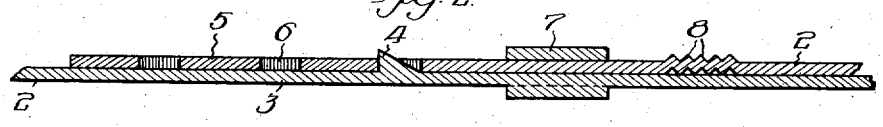
Fig. 2 is a section on the line 2—2 of Fig. 1.
Figure 3:
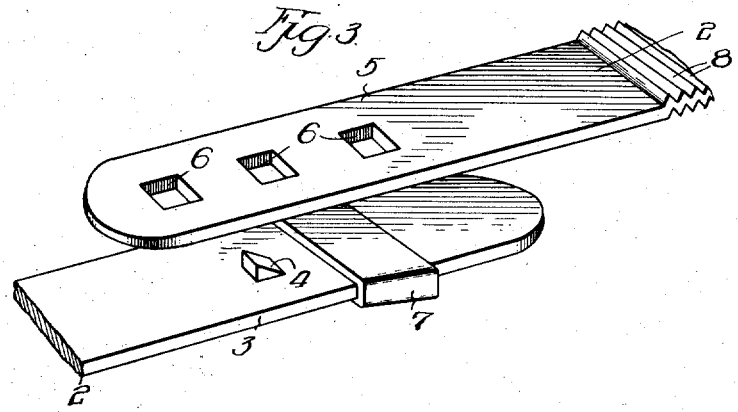
Fig. 3 is a perspective view of the interengaging ends of the bands detached.

It will be noticed in Fig. 2 that the apex of the lug 4 being higher above the plane of the band 2 than the loop 7, enough tension will be caused to throw the end 5 of the band flat on the end 3 when the lug 4 and one of the openings 6 are engaged.

It will be noticed by referring to Figs. 1 and 2 that at points in the length of the band there are crimps 8, the said crimps being designed to increase the flexibility of the band and to facilitate tightening the band around the package of letters or the like.

In practice, the band may be of different widths and thicknesses suitable for the purpose, and it is obvious that they are practically everlasting. There are no projections to snag or mutilate associated bundles and packages, and the band lies flat on the package. It is impossible for the band to become loosened in transit, and it is easily adjusted and released, and is inexpensive, and in all making a practical tying device for mail and like service.

The improved band can be sealed to insure delivery so that a letter once taken out of the package cannot be put back without breaking the seal.

I claim:

1. A spring strap having a portion provided with a lug, and a keeper for holding an overlapped end interlocked with said lug, and a recessed portion adapted to protrude through the keeper and receive said lug; said keeper being spaced perpendicularly from the surface from which the lug projects, whereby it holds the recessed portion in parallelism with the lug-bearing portion, and being spaced rearward from said lug to leave the lug-engaging portion of the strap freely flexible for locking and unlocking at will.

2. A spring strap having a portion recessed to receive an anchoring lug, and having a portion provided with an anchoring lug to interlock with said recessed portion when the portions are overlapped, and with a keeper to hold such interlock; the keeper being spaced from the lug a distance to permit interlock and release of the parts by the flexibility of the recessed portion, and a portion of the strap being continued on the opposite side of the keeper from the lug to guide the recessed end to the loop and keep the overlapped portions parallel and assist in maintaining the interlock.

3. In combination, a spring steel band having a plurality of lug engaging openings in one of its ends and a lug near the opposite end thereof, and a flat loop positioned intermediate the lug and the end of the band near which the lug is located, the said loop being adapted to receive the end of the band having openings therein, whereby one of said openings may be engaged by said lug, rising from the same surface with the lug and thereby holding overlapped ends in parallelism and spaced from the lug to render freely flexible the lug-engaging end of the band.

4. In combination, a spring steel band having at one of its ends a series of lug engaging openings and a lug near its opposite end, and a loop fixed to the said band intermediate the lug and the last mentioned end of the band and spaced longitudinally of the band from both the lug and said end, said end of the strap forming a guiding and sustaining surface upon which the opposite end of the band is adapted to slide.

5. A spring steel band having a series of holes at one end and means for detachably securing the opposite end of the steel band to said first end, said means comprising a lug near the second end of said band, and a loop near said second end forming a receiving space on the same face of the band as said lug, spaced longitudinally of the band from the lug, and of substantially the same cross sectional area as the first end of the said band, whereby when the first end of said band is inserted through said receiving space, one of the openings in said end may be brought into engagement with said lug.

6. A device of the character specified comprising a resilient metal band having at one end a loop and a lug, the other end of the band being adapted to pass through the loop and having a series of spaced openings for receiving the lug, said loop being of greatest width at the end remote from the lug and the lug having that face adjacent to the loop inclined.

Signed at Oskaloosa, Iowa, this 29th day of May, 1919.

WILSON ROY SPRINGER.